US012574510B2

(12) United States Patent
Zhao et al.

(10) Patent No.: US 12,574,510 B2
(45) Date of Patent: Mar. 10, 2026

(54) SYSTEMS AND METHODS FOR DERIVATION OF QUANTIZATION PARAMETERS FOR FRAME INTERPOLATION

(71) Applicant: Tencent America LLC, Palo Alto, CA (US)

(72) Inventors: Xin Zhao, Palo Alto, CA (US); Han Gao, Palo Alto, CA (US); Liang Zhao, Palo Alto, CA (US); Jing Ye, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/620,933

(22) Filed: Mar. 28, 2024

(65) Prior Publication Data

US 2025/0142060 A1     May 1, 2025

Related U.S. Application Data

(60) Provisional application No. 63/546,908, filed on Nov. 1, 2023.

(51) Int. Cl.
*H04N 19/117* (2014.01)
*H04N 19/172* (2014.01)
*H04N 19/82* (2014.01)

(52) U.S. Cl.
CPC ......... *H04N 19/117* (2014.11); *H04N 19/172* (2014.11); *H04N 19/82* (2014.11)

(58) Field of Classification Search
CPC ..... H04N 19/117; H04N 19/172; H04N 19/82
See application file for complete search history.

(56) References Cited

U.S. PATENT DOCUMENTS

| | | | |
|---|---|---|---|
| 2005/0243911 A1* | 11/2005 | Kwon | H04N 19/162 |
| | | | 375/240.18 |
| 2011/0317764 A1 | 12/2011 | Joshi et al. | |
| 2013/0182765 A1* | 7/2013 | Gao | H04N 19/17 |
| | | | 375/240.12 |
| 2018/0324439 A1* | 11/2018 | Wu | H04N 19/172 |
| 2021/0144377 A1* | 5/2021 | Lei | H04N 19/176 |
| 2021/0289201 A1 | 9/2021 | Bang et al. | |

(Continued)

OTHER PUBLICATIONS

Peter de Rivaz et al., "AV1 Bitstream & Decoding Process Specification", Version 1.0.0 with Errata 1, The Alliance for Open Media, Jan. 2019, 681 pgs.

(Continued)

*Primary Examiner* — Jae N Noh

(74) *Attorney, Agent, or Firm* — Morgan, Lewis & Bockius LLP

(57) ABSTRACT

An example method of video coding includes receiving a video bitstream for a plurality of encoded pictures. The method also includes obtaining a reconstructed picture that corresponds to an encoded picture of the plurality of encoded pictures and deriving a set of quantization parameters for the reconstructed picture, the set of quantization parameters derived from a set of reference quantization parameters for the encoded picture. The method further includes performing loop filtering on the reconstructed picture using the set of quantization parameters.

19 Claims, 7 Drawing Sheets

(56) References Cited

U.S. PATENT DOCUMENTS

2021/0368198 A1    11/2021  Zhang et al.
2022/0295071 A1     9/2022  Ji et al.

OTHER PUBLICATIONS

Yixin Du et al., "Prediction Enhancement Filter", Alliance for Open Media, Codec Working Group, Document: CWG-C086, Dec. 7, 2022, 12 pgs.
Tencent America LLC, ISRWO, PCT/US2024/024465, Aug. 2, 2024, 8 pgs.
Tencent America LLC, ISRWO, PCT/US2024/024467, Aug. 2, 2024, 8 pgs.
Tencent America LLC, ISRWO, PCT/US2024/023625, Sep. 5, 2024, 15 pgs.
Tencent America LLC, ISRWO, PCT/US2024/023624, Sep. 17, 2024, 14 pgs.

* cited by examiner

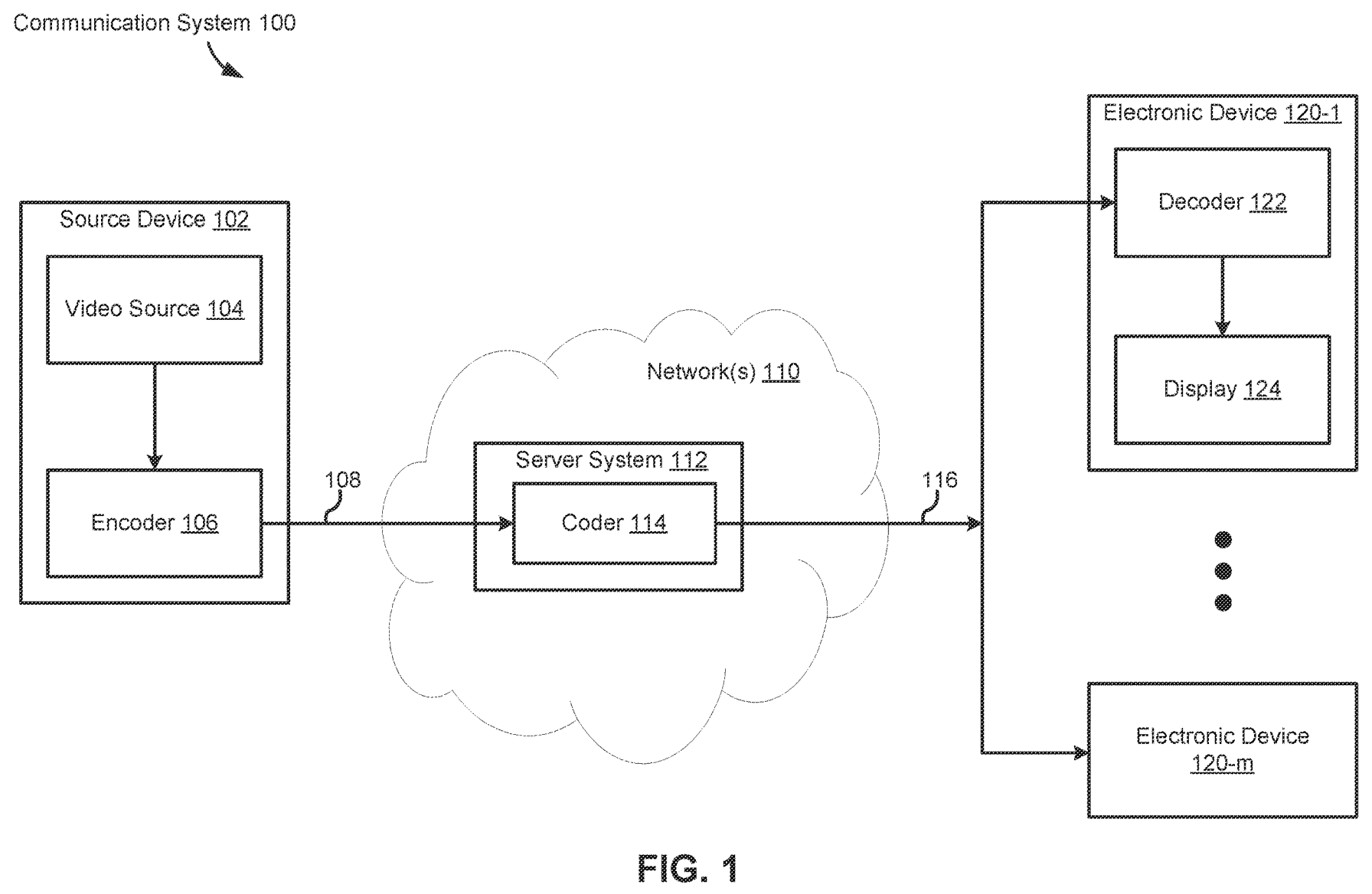

Communication System 100

Source Device 102
Video Source 104
Encoder 106

108

Network(s) 110
Server System 112
Coder 114

116

Electronic Device 120-1
Decoder 122
Display 124

Electronic Device 120-m

FIG. 1

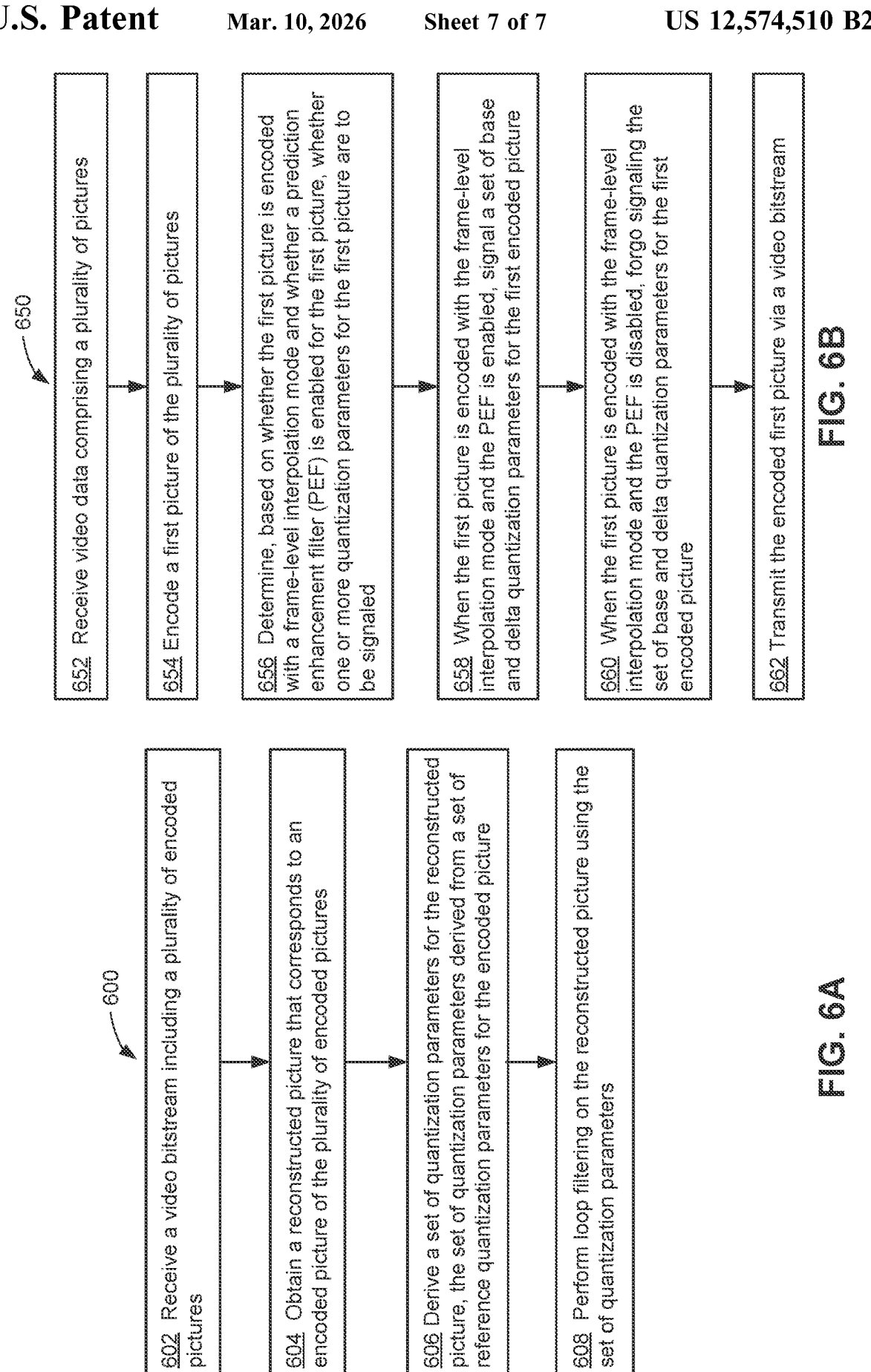

650

652 Receive video data comprising a plurality of pictures

654 Encode a first picture of the plurality of pictures

656 Determine, based on whether the first picture is encoded with a frame-level interpolation mode and whether a prediction enhancement filter (PEF) is enabled for the first picture, whether one or more quantization parameters for the first picture are to be signaled 658 When the first picture is encoded with the frame-level interpolation mode and the PEF is enabled, signal a set of base and delta quantization parameters for the first encoded picture 660 When the first picture is encoded with the frame-level interpolation mode and the PEF is disabled, forgo signaling the set of base and delta quantization parameters for the first encoded picture 662 Transmit the encoded first picture via a video bitstream

602 Receive a video bitstream including a plurality of encoded pictures

604 Obtain a reconstructed picture that corresponds to an encoded picture of the plurality of encoded pictures 606 Derive a set of quantization parameters for the reconstructed picture, the set of quantization parameters derived from a set of reference quantization parameters for the encoded picture 608 Perform loop filtering on the reconstructed picture using the set of quantization parameters

FIG. 6A

SYSTEMS AND METHODS FOR DERIVATION OF QUANTIZATION PARAMETERS FOR FRAME INTERPOLATION

RELATED APPLICATIONS

This application claims priority to U.S. Provisional Patent Application No. 63/546,908, entitled "Derivation of Quantization Parameters for Frame Interpolation" filed Nov. 1, 2023, which is hereby incorporated by reference in its entirety.

TECHNICAL FIELD

The disclosed embodiments relate generally to video coding, including but not limited to systems and methods for deriving quantization parameters for frame interpolation.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released.

SUMMARY

The present disclosure describes, amongst other things, deriving a set of quantization parameters for a reconstructed picture, the set of quantization parameters being derived from a set of reference quantization parameters for the encoded picture. The set of quantization parameters are then used to perform loop filtering on the reconstructed picture. Deriving the quantization parameters for each color component can improve video decoding accuracy and can also improve bandwidth efficiency (e.g., as compared to a system that signals the quantization parameters).

In accordance with some embodiments, a method of video decoding includes: (i) receiving a video bitstream comprising a plurality of encoded pictures; (ii) obtaining a reconstructed picture that corresponds to an encoded picture of the plurality of encoded pictures; (iii) deriving a set of quantization parameters for the reconstructed picture, the set of quantization parameters derived from a set of reference quantization parameters for the encoded picture; and (iv) performing loop filtering on the reconstructed picture using the set of quantization parameters.

In accordance with some embodiments, a method of video encoding includes (i) receiving video data comprising a plurality of pictures; (ii) encoding a first picture of the plurality of pictures in accordance with a frame-level mode; (iii) determining, based on the frame-level mode, that one or more quantization parameters for the encoded first picture are to be derived; (iv) transmitting the encoded first picture via a video bitstream; and (v) forgoing signaling, via the video bitstream, the one or more quantization parameters for the encoded first picture.

In accordance with some embodiments, a method of processing visual media data includes: (i) obtaining a source video sequence; and (ii) performing a conversion between the source video sequence and a bitstream of visual media data, where the bitstream comprises: (a) a plurality of encoded pictures, including a first encoded picture that is encoded in accordance with a frame-level mode; and (b) a first indicator to indicate whether one or more quantization parameters for the first encoded picture are signaled in the video bitstream.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and a decoder component (e.g., a transcoder). In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding. The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIG. 1 is a block diagram illustrating an example communication system in accordance with some embodiments.

FIG. 6A illustrates an example video decoding process in accordance with some embodiments.

FIG. 6B illustrates an example video encoding process in accordance with some embodiments.

In accordance with common practice, the various features illustrated in the drawings are not necessarily drawn to scale, and like reference numerals can be used to denote like features throughout the specification and figures.

DETAILED DESCRIPTION

Figure 2A:
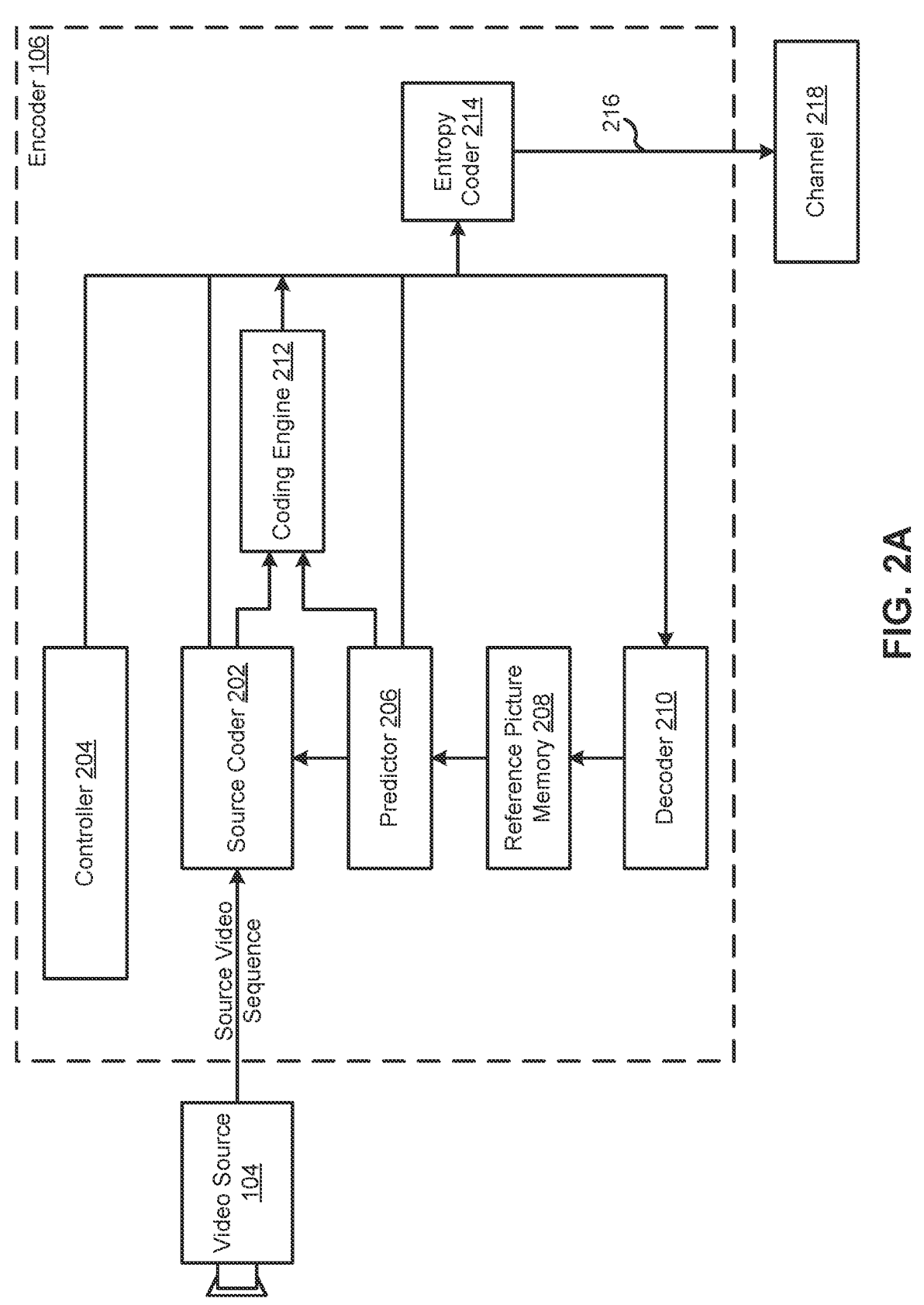
FIG. 2A is a block diagram illustrating example elements of an encoder component in accordance with some embodiments.

The present disclosure describes video/image compression techniques including conditionally deriving quantization parameters using reference quantization parameters from reference frames of a current frame. The derived quantization parameters can then be used when performing subsequent loop filtering operations on a reconstructed picture. In some embodiments, the quantization parameters are derived in accordance with the current frame being derived using frame-level interpolation (e.g., via a TIP mode). For example, quantization indices may be derived as the average of those from the reference frames.

Example Systems and Devices

FIG. 1 is a block diagram illustrating a communication system 100 in accordance with some embodiments. The communication system 100 includes a source device 102 and a plurality of electronic devices 120 (e.g., electronic device 120-1 to electronic device 120-m) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

FIG. 2A is a block diagram illustrating example elements of the encoder component 106 in accordance with some embodiments. The encoder component 106 receives video data (e.g., a source video sequence) from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples.

The encoder component 106 is configured to code and/or compress the pictures of the source video sequence into a coded video sequence 216 in real-time or under other time constraints as required by the application. In some embodiments, the encoder component 106 is configured to perform a conversion between the source video sequence and a bitstream of visual media data (e.g., a video bitstream). Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. Additionally, the description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
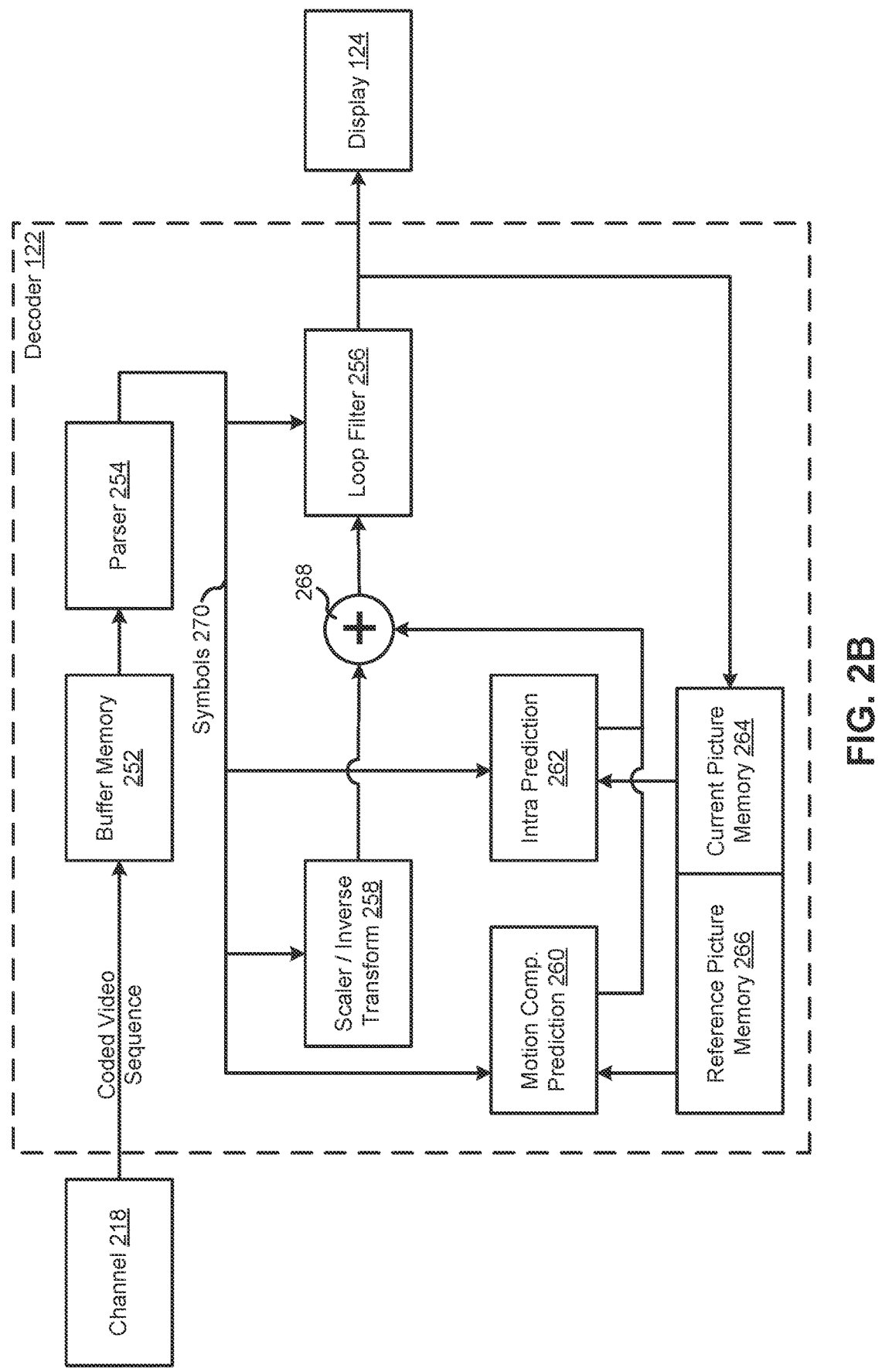
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, e.g., temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. The decoder component 122 may be implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and/or of adaptive size, and may at least partially be implemented in an operating system or similar elements outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268. In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation may also include interpolation of sample values as fetched from the reference picture memory 266, e.g., when subsample exact motion vectors are in use, motion vector prediction mechanisms.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
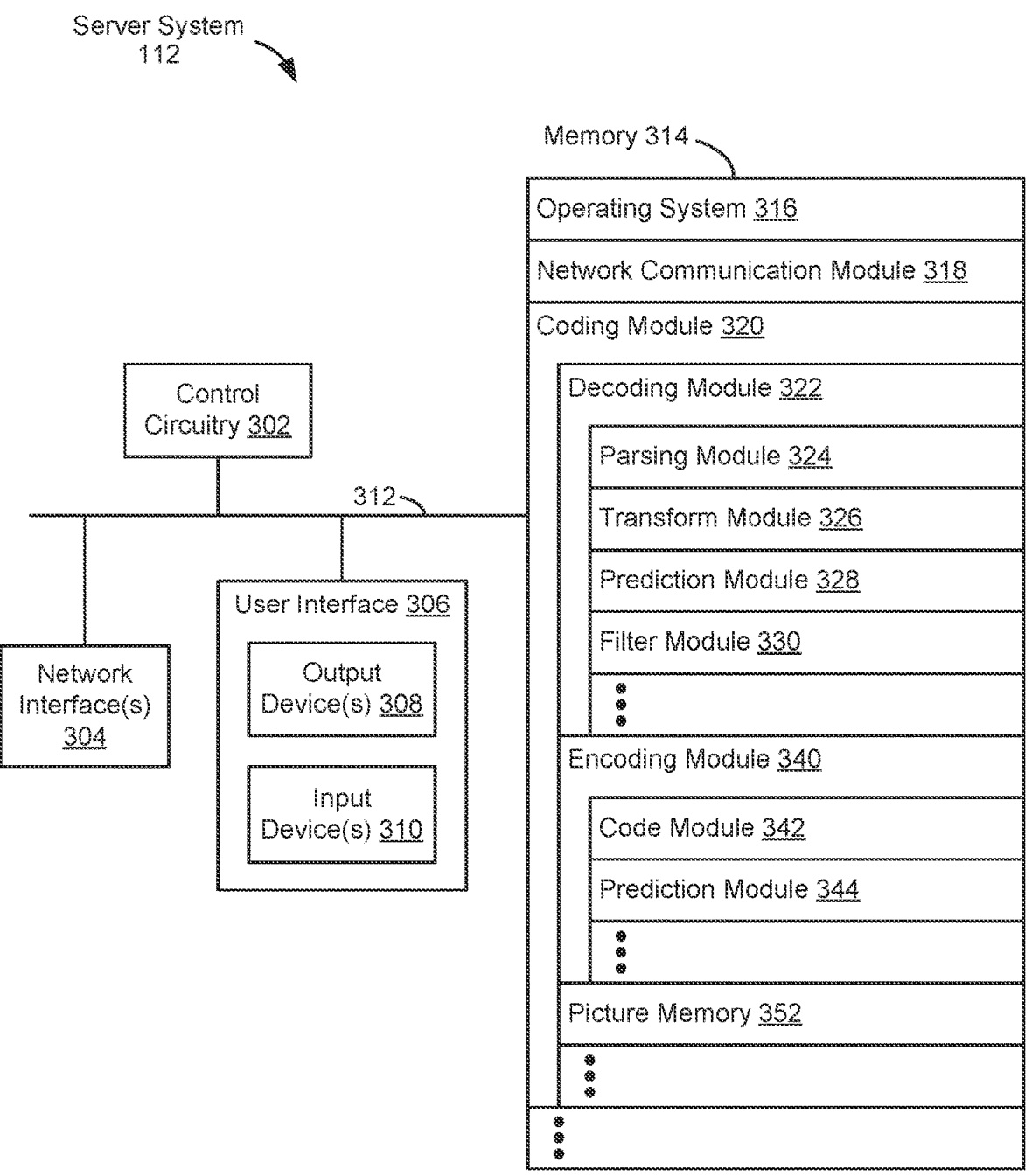
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes field-programmable gate array(s), hardware accelerators, and/or integrated circuit(s) (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:

- a decoding module 322 for performing various functions with respect to decoding encoded data, such as those described previously with respect to the decoder component 122; and
- an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above.

Although FIG. 3 illustrates the server system 112 in accordance with some embodiments, FIG. 3 is intended more as a functional description of the various features that may be present in one or more server systems rather than a structural schematic of the embodiments described herein. In practice, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Techniques

As discussed above, some codecs (e.g., AV1) operate on pixel blocks. Each pixel block may be processed in a predictive-transform coding scheme, where a prediction is obtained using intra frame reference pixels, inter frame motion compensation, or some combinations of the two. The residuals from the prediction may undergo a transform (e.g., a 2-D unitary transform) to further remove spatial correlations and the transform coefficients are quantized. Both the prediction syntax elements and the quantized transform coefficient indexes may then entropy coded using arithmetic coding.

Figure 4A:
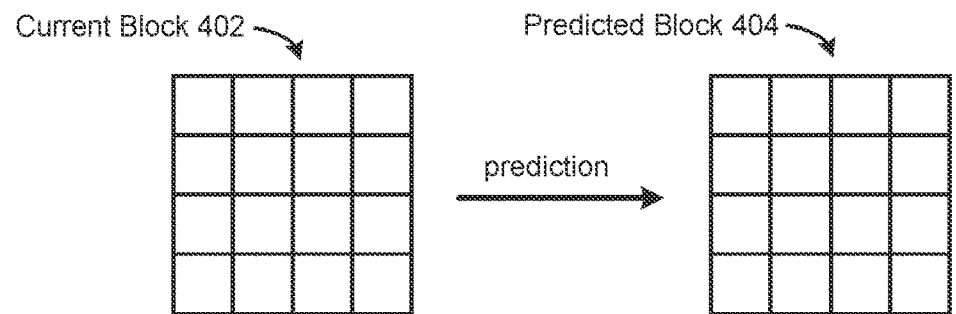
FIGS. 4A-4C illustrate example prediction blocks, residue blocks, and reconstructed blocks in accordance with some embodiments.
Figure 4B:
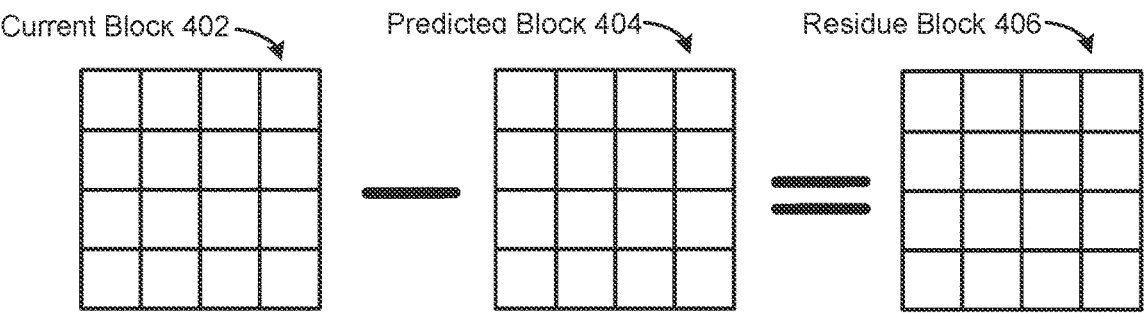
Figure 4C:
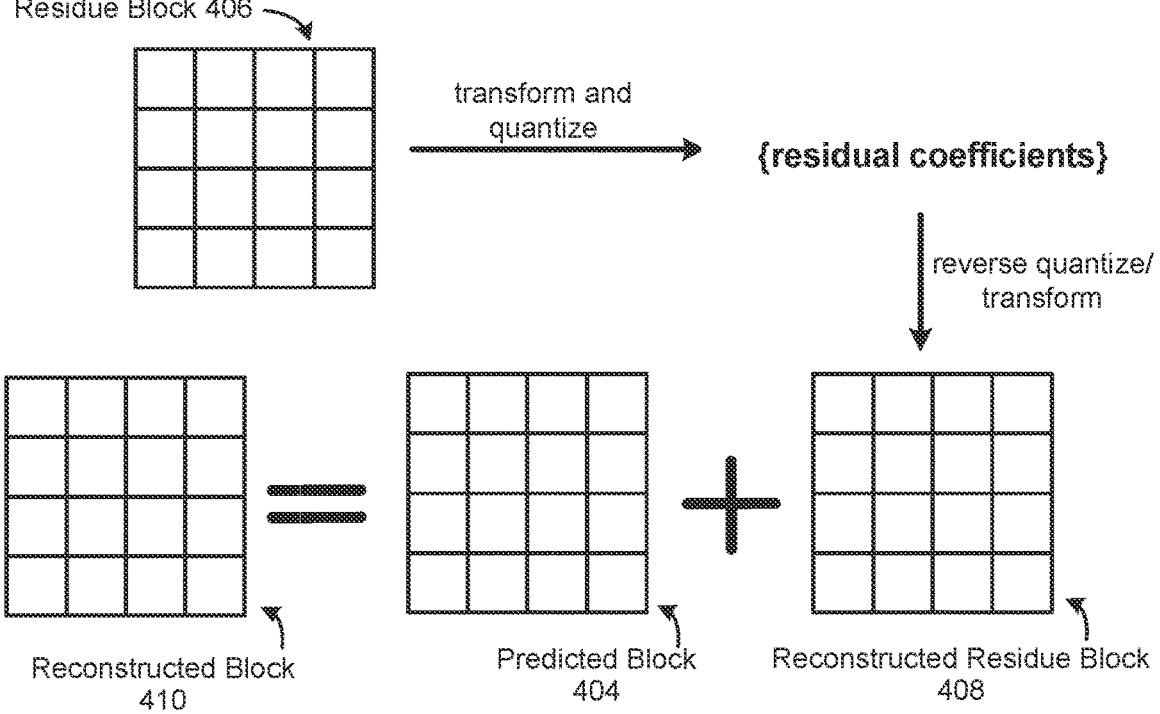

FIG. 4A illustrates the computation of a prediction block in accordance with some embodiments. In the example of FIG. 4A, an intra prediction is performed on a current block 402 to generate a predicted block 404. The current block 402 includes a set of samples (e.g., pixel blocks) and the prediction block 404 includes a set of predictions that correspond to the set of samples. FIG. 4B illustrates the computation of a residue block in accordance with some embodiments. As shown in FIG. 4B, the prediction block 404 is subtracted from the current block 402 to generate a residue block 406 that includes a set of residues. For example, respective differences are calculated between each sample and the corresponding prediction. FIG. 4C illustrates the computation of a reconstructed block in accordance with some embodiments. As shown in FIG. 4C, the residue block 406 undergoes one or more transformations and quantization to generate a set of residual coefficients. The set of residual coefficients may be transmitted from an encoder component to a decoder component. The set of residual coefficients undergo a reverse quantization and reverse transformation to generate a reconstructed residue block 408. The reconstructed residue block 408 is combined with the predicted block 404 (e.g., reconstructed residues of the reconstructed residue block 408 are added to predictions of the prediction block 404) to generate a reconstructed block 410 corresponding to the current block 402.

To reduce the redundancy in residual signals, various residue prediction technologies have been developed. These technologies forecast residue signals and encode the refined residues. Residual Difference Pulse Code Modulation (RDPCM) entails employing sample-based differential pulse code modulation along the horizontal or vertical axes. By doing so, each residual row in the horizontal mode (or column in the case of vertical orientation) can be reconstructed at the decoder by summing the scaled differential pulse code modulation residual levels along the respective row (or column). RDPCM may be an explicit type or an implicit type. The explicit type requires supplementary signaling of the direction, and its application is confined to inter-predicted blocks exclusively. On the other hand, the implicit type doesn't require direction signaling and can only be applied to intra-predicted blocks, with the prediction direction tied to the intra prediction mode. Block-based Differential Pulse Code Modulation (BDPCM) performs sample-based differential pulse code modulation on the reconstructed samples, not the residual samples. The indication of the usage of the second mode occurs during the prediction mode reconstruction process. This signaling involves two syntax elements each for both luma and chroma, e.g., the initial syntax element flag denotes its utilization, while the second syntax element flag specifies the horizontal or vertical direction. Thus, a decoder may receive video data comprising a plurality of blocks, including a first block and a plurality of residual coefficients, from a video bitstream.

Figure 5A:
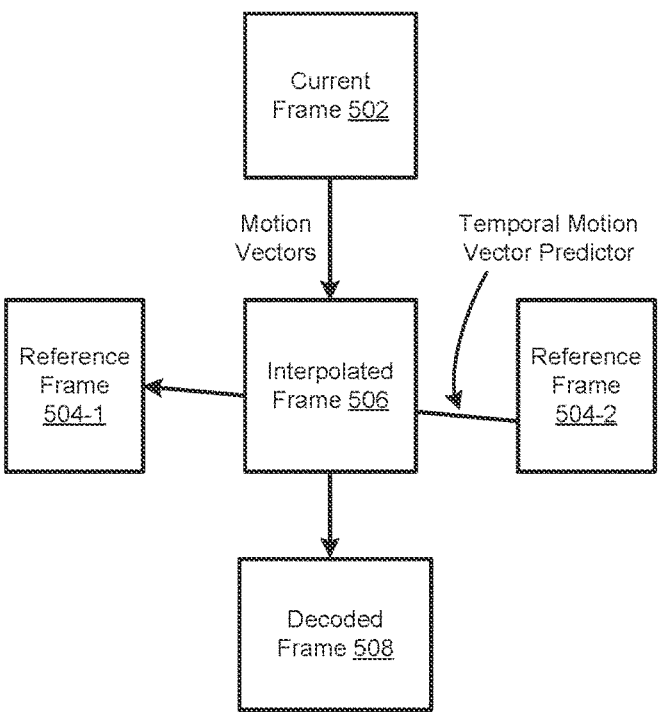
FIG. 5A illustrates an example temporal interpolation prediction (TIP) mode in accordance with some embodiments.

FIG. 5A illustrates a TIP mode in accordance with some embodiments. In the example of FIG. 5A, information in reference frames 504-1 and 504-2 is combined and projected to a same time instance as a current frame 502 using an interpolation process. In some embodiments, multiple TIP modes are supported. In a first example TIP mode, an interpolated frame 506 is used as an additional reference frame. A coding block of the current frame 502 may directly reference the interpolated frame 506 and thereby utilize the information coming from two different references with only the overhead cost of a single inter prediction mode. In another example TIP mode, the interpolated frame 506 is directly assigned as a decoded frame 508, the output of the decoding process for the current frame 502 (e.g., skipping other traditional coding steps such as generating residue blocks). This mode may provide considerable coding and simplification benefits, especially for low-bitrate applications. Other techniques may be used to interpolate a frame between two reference frames, such as Frame Rate Up Conversion (FRUC).

An example TIP mode includes generating an interpolated frame 506 corresponding to the current frame 502. The interpolated frame 506 may then be used as either an additional reference frame for the current frame 502, or be directly assigned as a reconstructed output of a decoder for the current frame 502. At the decoder side, the blocks coded in a TIP mode may be generated on-the-fly, such that it is not necessary to create the whole interpolated frame 506 at the decoder, conserving decoding time and processing. The frame level TIP mode may be indicated using a syntax element. Examples of modes, indicated by values for a tip_frame_mode parameter, are shown below in Table 1.

TABLE 1

| Example TIP modes | |
| --- | --- |
| tip_frame_mode | Meaning |
| 0 | Disable TIP mode in this frame |
| 1 | Use TIP frame as an additional reference frame |
| 2 | Directly output TIP frame, no coding of the current frame |

An example interpolation method for interpolating an intermediate frame between two frames may reuse the motion vectors from the available references. The same motion vectors may also be used for the temporal motion vector predictor (TMVP) process after minor modification. For example, a coarse motion vector field may be created for the TIP frame through projection of the modified TMVP field. In this example, the coarse motion vector field refined by filling holes and using smoothing operations. In this example, the TIP frame is generated using the refined motion vector field. At the decoder side, the blocks coded with TIP mode may be generated on-the-fly without creating the whole TIP frame. However, other suitable interpolation methods may be substituted, in combination with other features discussed in this disclosure.

Figure 5B:
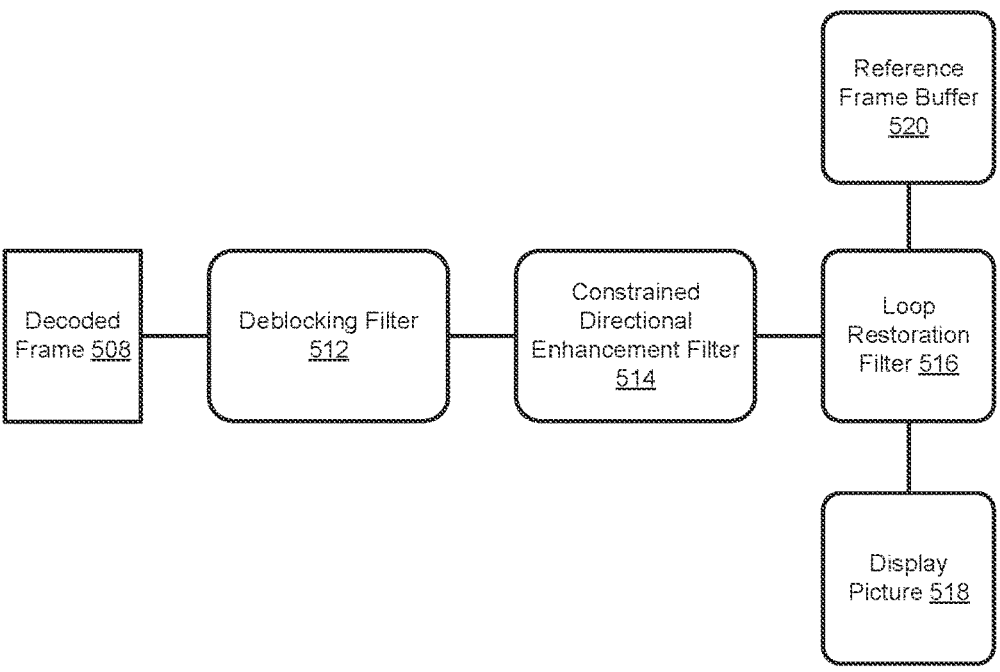
FIG. 5B illustrates example in-loop filtering stages in accordance with some embodiments.

FIG. 5B illustrates example in-loop filtering stages in accordance with some embodiments. In the example of FIG. 5B, the in-loop filtering stages applied to the decoded frame 508 include a deblocking filter 512, a constrained direction enhancement filter (CDEF) 514, and a loop restoration filter 516. In some embodiments, the filtered output frame is used as a reference frame for later frames (e.g., stored in a reference frame buffer 520). In some embodiments, a normative film grain synthesis stage is also applied to generate a corresponding displayed picture 518. Unlike the in-loop filter stages, the results of the film grain synthesis stage (e.g., an out-of-loop filter) does not influence the prediction for subsequent frames. The loop filtering methods may include any filtering process applied on the reconstructed samples (e.g., after adding residual to the prediction), including wiener loop filtering, cross-component filtering, and constrained directional enhancement filter (CDEF).

A cross-component filtering method may use a co-located reconstructed sample and neighboring reconstructed samples from a first color component as input, to perform filtering of the current reconstruction sample of a second color component. A cross-component offset filtering method may use the co-located reconstructed sample and its neighboring reconstructed samples from a first color component as input, to derive an offset value that is added on the current sample of a second color component to adjust its reconstruction value. The first color component may refer to a luma color component, and the second color component may refer to a chroma color component. The first color component and second color component may be the same color component (e.g., a luma component).

The deblocking filter 512 may be applied across the transform block boundaries to remove block artifacts caused by the quantization error. In some embodiments, a filter length is determined based on the minimum transform block sizes on both sides. In some embodiments, finite impulse response (FIR) filters (e.g., low-pass filters) are used by the deblocking filter 512. Edge detection may be used to disable the deblocking filter at transitions that contain a high variance signal (e.g., to avoid blurring an actual edge in the original image). In this way, a deblocking filtering method may be applied on reconstructions samples located close to block boundaries. The block boundaries may include a transform block boundary, a motion compensation block boundary, a coding block boundary, and/or a fixed block size boundary.

The CDEF 514 applies a non-linear de-ringing filter along particular (e.g., oblique) directions. The CDEF 514 may operate on an output of the deblocking filter 512. The CDEF 514 may operate in 8×8 units. In some embodiments, 8 preset directions are defined by rotating and reflecting templates of preset directions. The decoder may use the reconstructed pixels to select the prevalent direction index. A primary filter may be applied along the selected direction, and a secondary filter may be applied along an offset direction (e.g., oriented 45° off the primary direction). In some embodiments, up to 8 groups of filter parameters are signaled (e.g., in a frame header). The groups of filter parameters may include the primary and secondary filter strength indexes of luma and chroma components. The CDEF may apply filtering on reconstruction samples by identifying the direction of each block and then adaptively filtering with a high degree of control over the filter strength along the direction and across it.

In some embodiments, the loop restoration filter 516 is applied to reconstructed pixels after any prior in-loop filtering stages (e.g., the deblocking filter 512 and/or the CDEF 514). The loop restoration filter 516 may be applied to loop restoration units (LRU), e.g., 64×64, 128×128, and/or 256×256 pixel blocks. Bypass filtering, a wiener filter (e.g., a wiener loop filtering method), and/or a self-guided filter may be applied to each LRU independently. A wiener loop filtering method may use a linear weighted sum of the current reconstruction sample and multiple spatially neighboring reconstruction samples as input to derive a modified value for the current reconstruction sample as the output.

As described above, a frame interpolation method may derive prediction samples by interpolating the current picture using one or more reference pictures (e.g., 1, 2, or 3 reference pictures) and fetching the prediction samples directly from the interpolated picture. The frame interpolation method may include a frame-level mode (e.g., tip_frame_mode=2 in Table 1) which directly uses the interpolated picture as the reconstructed picture without sending any residuals. The frame interpolation method may include a block-level mode that uses the interpolated picture as an extra reference frame, and motion vectors and residual can be further signaled. When the frame-level mode of the frame interpolation method is applied, a deblocking filtering process can be applied on the reconstructed picture, e.g., to alleviate the blocking artifacts caused by the block-based frame interpolation process. To perform deblocking, some parameters related to quantization process need to be provided to control the strength of deblocking.

Subblock-based inter prediction techniques, such as TIP and optical flow motion vector refinement (OPFL), may introduce blocking artifacts during the prediction process. These artifacts may be difficult to remove by the deblocking filter. In some embodiments, a prediction enhancement filter (PEF) is employed during the prediction stage (e.g., to improve visual quality with a minor encoding and decoding implementation impact).

In subblock-based inter prediction, such as for the TIP and OPFL modes, a prediction unit (PU) may be split into smaller motion compensation units (MCUs). Each MCU may have its own motion vector(s) pointing to the reference frame(s). When the motion information of a MCU is different from its neighbors, blocking artifacts may show up along the MCU boundaries (e.g., when there is no residual due to the low bitrate budget). The deblocking filter 512 discussed above may only address PU and TU boundaries. Thus, the MCU boundaries may not be handled by the deblocking filter when they are not aligned with a PU or TU boundary.

In a TIP mode, a TIP reference frame may be generated in units of 8×8 MCUs. The TIP frame is then referenced by a current block via a motion vector. Because the motion vector may have an arbitrary value, the blocking artifacts due to the use of the TIP mode in the final prediction and/or reconstruction may not align the 8×8 grid of the PU and that of the reconstructed frame. Also, the TIP reference may already contain blocking artifacts along the boundary of each MCU.

In some embodiments, a PEF is applied in the prediction stage to reduce the blocking artifacts resulting from the TIP and/or OPFL prediction processes and thereby improve visual quality. For example, since the location of blocking artifacts may not align with 8×8 grid, two parameters may be derived based on the value of the motion vector to identify the location of the blocking artifacts. Then, the PEF may be applied on the prediction samples of the internal MCU boundary to reduce the blocking artifacts. When the TIP reference frame is used as a direct output, the filter may be applied on the 8×8 grid of the TIP frame. In an OPFL mode, the size of an MCU may be equal to 8×8 or 4×4 and the location of the blocking artifacts may be aligned with the 8×8 or 4×4 grid. The filtering may be applied on the prediction samples located on the internal MCU boundary to reduce blocking artifacts.

The PEF may include multiple steps. First, a determination is made regarding whether an MCU-level filter is on or off. For example, the motion vector difference on both sides of the MCU boundary is checked. When the motion vector difference is less than a threshold, the filtering of the boundary may be skipped. For filtering on TIP, the TMVP motion vector may be used to check the motion vector difference; For filtering on OPFL, the OPFL-refined motion vector may be used instead. Next, the filter on/off decision may be made at a sample level. For example, the mask may be derived based on samples near the boundary (e.g., the logic may be a simplified version of what is used in the deblocking filter 512). Next, a delta value is derived (similar to deblocking filter logic) and an offset is derived and applied to each one of the samples to-be-filtered.

In some embodiments, a prediction filtering method (e.g., the PEF) applies filtering on the prediction block when subblock motion compensation is used. In some embodiments, a subblock motion method performs motion compensation on a subblock basis, e.g., when there are multiple subblocks within one coding block. In an example, an optical flow-based prediction may be used to refine the motion compensation of each subblock within a given coding block using the optical flow function, and optical flow-based prediction is an example of the subblock motion method described above. In addition, the prediction filtering method may be also applied on the block unit that performs the frame interpolation in the frame level mode of the frame interpolation method.

In some embodiments, a TIP frame-level mode is modified by using implicit quantization indices. When the interpolated frame derived by the TIP mode is directly assigned as the output of the decoding process for the current frame (e.g., the TIP frame-level mode), the luma and chroma quantization indices of the current frame are not signaled, instead derived from the quantization indices of the reference frames implicitly. In this way, the coding bits consumed by signaling quantization indices are saved. In some embodiments, a sequence level flag is used to switch between the implicit and explicit frame-level signaling of luma and chroma quantization parameters (QPs) for the TIP frame-level mode.

As discussed above, in a TIP mode, an intermediate frame is generated through interpolation by exploiting the motion vector fields of a forward and a backward reference frame. In a first TIP mode (e.g., TIP_FRAME_AS_REF also sometimes referred to as TIP block-level mode), the interpolated frame is used as an additional reference frame for the current frame. In a second TIP mode (e.g., TIP_FRAME_AS_OUTPUT also sometimes referred to as TIP frame-level mode), the interpolated frame is directly output as the reconstruction of the current frame. As described above, when a TIP mode is used, a PEF may be applied to the interpolated frame to remove the blocking artifacts. The PEF requires the luma and chroma quantization indices of the AC coefficients for deblocking, which may need to be signaled from the encoder side to the decoder side. However, in some existing codec standards only the quantization indices associated with the luma AC coefficients are signaled, and the quantization indices associated with the chroma AC coefficients are not signaled. This may cause encoder-decoder mismatch when the bitstream is produced by an encoder using a non-CTC configuration, since the knowledge on the quantization indices associated for chroma AC coefficients is missing for decoder but used by the encoder to perform PEF filtering.

The quantization indices for TIP frame-level mode may be used for performing PEF filtering, and not used for coefficient coding as there are no residuals signaled in a TIP frame-level mode. Therefore, the signaling of quantization indices is relatively more costly compared to other frames when residuals are coded. The methods described below address this issue.

When the TIP frame-level mode is selected, the luma and chroma quantization indices of the AC coefficients may be derived from the reference frames rather than being signaled from the encoder side to the decoder side. For example, the quantization indices may be derived as the average of those from the reference frames. The terms base_q_idx, DeltaQUAc, and DeltaQVAc may denote the quantization indices for the luma AC coefficients, and the delta quantization indices relative to base_q_idx for the Cb and Cr AC coefficients, respectively. In this way, the quantization indices of the current interpolated frame may be represented as shown in Equation Set 1:

Equation Set 1–Quantization Indices $$\text{base\_q\_idx}_{cur} = \left(base_{q_{idx_{ref1}}} + base_{q_{idx_{ref2}}} + 1\right) \gg 1$$

$$DeltaQUAc_{cur} = (DeltaQUAc_{ref1} + DeltaQUAc_{ref2} + 1) \gg 1$$

$$DeltaQVAc_{cur} = (DeltaQVAc_{ref1} + DeltaQVAc_{ref2} + 1) \gg 1$$

In Equation Set 1, the subscript "cur" corresponds to the current interpolated frame and the subscript "ref1" and "ref2" corresponds to the two reference frames. In addition, a sequence-level flag may be use to switch between the above implicit QP derivation scheme and explicit frame-level signaling of luma and chroma QPs for the TIP frame-level mode.

FIG. 6A is a flow diagram illustrating a method 600 of decoding video in accordance with some embodiments. The method 600 may be performed at a computing system (e.g., the server system 112, the source device 102, or the electronic device 120) having control circuitry and memory storing instructions for execution by the control circuitry. In some embodiments, the method 600 is performed by executing instructions stored in the memory (e.g., the memory 314) of the computing system.

The system receives (602) a video bitstream including a plurality of encoded pictures. The system obtains (604) a reconstructed picture that corresponds to an encoded picture of the plurality of encoded pictures. For example, the system derives the reconstructed picture using a frame interpolation method. The system derives (606) a set of quantization parameters for the reconstructed picture, the set of quantization parameters derived from a set of reference quantization parameters for the encoded picture. The system performs (608) loop filtering on the reconstructed picture using the set of quantization parameters. For example, the system performs one or more loop filtering techniques on the reconstructed picture.

In some embodiments, a first flag (e.g., a first indicator) is signaled to indicate whether a frame level mode of the frame interpolation method is applied, and a second flag (e.g., a second indicator) is signaled to indicate whether the prediction filtering method is applied. In some embodiments, a third flag (e.g., a third indicator) is conditionally signaled to indicate whether an explicit or implicit quantization parameter derivation method is applied (e.g., whether one or more quantization parameters are signaled) on top of frame-level mode of the frame interpolation method. In some embodiments, the condition depends on the signaling of the value of the first flag and the second flag. As used herein a "flag" may refer to either a syntax with binary value, or a syntax with more than two value options.

In some embodiments, the first and/or second flag is signaled in high-level syntax. An example implementation is shown below in Example Syntax 1.

| Example Syntax 1 - General Sequence Header OBU Syntax | |
| --- | --- |
| | Type |
| sequence_header_obu( ) { | |
|   seq_profile | f(3) |
|   ... | |
|   enable_tip | f(2) |
|   if ( enable_tip ) { | |
|     enable_tip_hole_fill | f(1) |
|   } | |
|   ... | |
|   enable_pef | f(1) |
|   if ( enable_tip == 1 && enable_pef ) { | |
|     enable_tip_explicit_qp | |
|   } | |
| } | |

In Example Syntax 1, enable_tip is the first flag signaling whether the frame interpolation method is applied, and enable_tip equal to 1 indicates that the frame level mode of the frame interpolation method is being applied. In Example Syntax 1, enable_pef is the second flag signaling whether the prediction filtering method is applied, and enable_tip_explicit_qp is the third flag signaling whether the explicit or implicit quantization parameter derivation method is applied on top of frame-level mode of the frame interpolation method, where the third flag (enable_tip_explicit_qp) is signaled based on the condition that both enable_tip is equal to 1 and enable_pef is nonzero.

In some embodiments, the third flag is signaled after the first flag and the second flag. For example, the third flag is signaled right after the second flag. In another example, the third flag is signaled right after the first flag.

In some embodiments, when the third flag is signaled with a value that explicit quantization parameter derivation method is applied on top of frame-level mode of the frame interpolation method, the following flags may be signaled partially or together. A fourth flag is signaled to specify the luma related quantization parameter. If the current frame has more than one color components, then a fifth flag is signaled to specify whether the other two chroma color components share the same delta quantization parameter relative to the luma quantization parameter. If the fifth syntax is signaled with a value indicating that the two chroma color components share the same delta quantization parameter, then one single delta quantization parameter value is signaled. Otherwise, two delta quantization parameter values are signaled for Cb and Cr color components, separately. If the current frame has only a luma component (e.g., is monochrome), then the delta quantization parameter values for Cb and Cr color components are not signaled and set as a default value, e.g., 0. In some embodiments, the above flags/syntaxes are signaled in high-level syntax.

An example frame header is shown below in Example Syntax 2.

| Example Syntax 2 - Uncompressed Header Syntax | |
| --- | --- |
| | Type |
| uncompressed_header( ) { | |
|   ... | |
|   if ( use_ref_frame_mvs == 1 ) | |
|     motion_field_estimation( ) | |
|   if (tip_frame_mode == TIP_FRAME_AS_OUTPUT) { | |
|     if ( enable_tip_explicit_qp ) { | |

| -continued | |
| --- | --- |
| Example Syntax 2 - Uncompressed Header Syntax | |
| | Type |
|     base_q_idx | f(8) |
|     if ( NumPlanes > 1 ) { | |
|       if ( separate_uv_delta_q ) { | |
|         diff_uv_delta | f(1) |
|       } else { | |
|         diff_uv_delta = 0 | |
|       } | |
|       DeltaQUAc = read_delta_q( ) | |
|       if ( diff_uv_delta ) { | |
|         DeltaQVAc = read_delta_q( ) | |
|       } else { | |
|         DeltaQVAc = DeltaQUAc | |
|       } | |
|     } else { | |
|       DeltaQUAc = 0 | |
|       DeltaQVAc = 0 | |
|     } | |
|   } else { | |
|     base_q_idx = (base_q_idx0 + base_q_idx1 + 1) >> 1 | |
|     DeltaQUAc = (DeltaQUAc0 + DeltaQUAc1 + 1) >> 1 | |
|     DeltaQVAc = (DeltaQVAc0 + DeltaQVAc1 + 1) >> 1 | |
|   } | |
|   tile_info( ) | |
|   film_grain_params( ) | |
| } | |
| else { | |
|   tile_info( ) | |
|   quantization_params( ) | |
|   ... | |
|   } | |
| } | |

In Example Syntax 2, base_q_idx is the fourth flag, diff_uv_delta is the fifth flag, and DeltaQUAc and DeltaQVAc are delta quantization parameter for Cb and Cr, relatively to luma quantization parameter.

In some embodiments, quantization related parameters are derived and used in the frame-level mode of a frame interpolation method. In some embodiments, the quantization related parameters for each color components (including luma and chroma) are signaled, and these quantization related parameters are used to perform the loop filtering on top of the reconstructed picture of frame-level mode of the frame interpolation method. In some embodiments, the quantization parameters related to chroma color components are signaled on top of the frame-level mode of the frame interpolation method. For example, the quantization parameters related to the quantization on chroma AC coefficients (such as u_ac_delta_q and v_ac_delta_q) may be signaled in a video bitstream. As another example, the quantization parameters related to the quantization on chroma DC coefficients may be signaled. In some embodiments, the frame-level mode is a direct output prediction such as whole frame skip mode, global motion, and/or temporal interpolated prediction.

In some embodiments, only a selected subset of quantization parameters for the picture are signaled, and part of quantization parameters are implicitly derived but not signaled. In some embodiments, only the quantization parameters related to the quantization applied on luma color components are signaled for the picture, and, for quantization parameters related to chroma color components, the parameters are implicitly derived. As an example, it is restricted that chroma quantization parameters are same with luma, such that chroma quantization related parameters are not signaled but implicitly derived. As another example, it is restricted that the chroma delta quantization parameters (used to indicate the difference of quantization parameters between chroma and luma, or between chroma AC coefficients and chroma DC coefficients) are zero, such that the signaling of chroma delta quantization parameters are not needed.

In some embodiments, the quantization parameters associated with one or more reference pictures (used to derive the interpolated frame of the current frame using the frame interpolation method) are used to derive the quantization parameters that are used to perform loop filtering on the interpolated frame of the current frame using the frame interpolation method.

In some embodiments, a weighted sum of the quantization parameters associated with the reference pictures (used to derive the interpolated frame of the current frame using the frame interpolation method) is calculated to derive the quantization parameters that are used to perform loop filtering on the interpolated frame of the current frame using the frame interpolation method.

In some embodiments, the difference between the quantization parameters used for chroma AC coefficients and other signaled quantization parameters (e.g., u_ac_delta_q and v_ac_delta_q) are derived by the corresponding syntaxes used in the reference frames (e.g., u_ac_delta_qref1 and u_ac_delta_qref2, v_ac_delta_qref1 and v_ac_delta_qref2, where ref1 and ref2 refer to the first and second reference pictures) using Equation Set 1 below.

Equation Set 2—Chroma AC Delta Derivation u_ac_delta_q =

$$(w0*u\_ac\_delta\_q_{ref1} + w1*u\_ac\_delta\_q_{ref2} + r0)/(w0+w1)$$

v_ac_delta_q =

$$(v0*v\_ac\_delta\_q_{ref1} + v1*v\_ac\_delta\_q_{ref2} + r1)/(v0+v1)$$

Example values of weighting factors, w0, w1, v0 and v1 include but not limited to:

$$w0 = w1 = v0 = v1 = 1, \text{ where } r0 = (w0+w1)/2 \text{ and } r1 = (v0+v1)/2.$$

In some embodiments, the quantization parameters used for chroma color components (e.g., base_qindex+u_ac_delta_qand base_qindex+v_ac_delta_q) are derived by the quantization parameters used in the reference frames (base_qindexref1+u_ac_delta_qref1, base_qindexref2+u_ac_delta_qref2, base_qindexref1+v_ac_delta_qref1 and base_qindexref2+v_ac_delta_qref2) using Equation Set 2 below.

Equation Set 3—Chroma AC Coefficient Derivation base_qindex + u_ac_delta_q =

$$(w0*(base\_qindex_{ref1} + u\_ac\_delta\_q_{ref1}) +$$

$$w1*(base\_qindex_{ref2} + u\_ac\_delta\_q_{ref2}) + r0)/(w0+w1)$$

base_qindex + v_ac_delta_q = $(v0*(base\_qindex_{ref1} + v\_ac\_delta\_q_{ref1}) +$ $$v1*(base\_qindex_{ref2} + v\_ac\_delta\_q_{ref2}) + r1)/(v0+v1)$$

In Equation Set 2, ref1 and ref2 refer to the first and second reference pictures respectively. In some embodiments, the weighting factors are implicitly derived using coded information, such as the temporal distance of the reference frames to the current frame, the temporal layer associated with the reference frames, the coding mode used in the reference frames, whether the reference frames are intra only frames, and/or whether global motion is used in the reference frame.

In some embodiments, all quantization parameters that are used to perform loop filtering on top of the frame reconstruction using frame-level mode of the frame interpolation method are implicitly derived. In some embodiments, the quantization parameters associated with the reference pictures (used to derive the interpolated frame of the current frame using the frame interpolation method) are used to derive the quantization parameters that are used to perform loop filtering on the interpolated frame of the current frame using the frame interpolation method.

In some embodiments, a weighted sum of the quantization parameters associated with the reference pictures (used to derive the interpolated frame of the current frame using the frame interpolation method) is calculated to derive the quantization parameters that are used to perform loop filtering on the interpolated frame of the current frame using the frame interpolation method.

In some embodiments, the quantization parameters used for luma and/or chroma, that are associated with the reference frame, are used to calculate the quantization parameters used for luma and/or chroma. For example, denote the luma AC coefficient QP (quantization parameters) as base QP, the difference between luma AC and chroma AC QPs as u_ac_delta_q and v_ac_delta_q for Cb and Cr color components, respectively.

Equation Set 4—Luma Base and Chroma Delta AC Derivation $$base\_qindex = (k0*base\_qindex_{ref1} + k1*base\_qindex_{ref2} + r0)/(k0+k1)$$

u_ac_delta_q =

$$(w0*u\_ac\_delta\_q_{ref1} + w1*u\_ac\_delta\_q_{ref2} + r1)/(w0+w1)$$

v_ac_delta_q =

$$(v0*v\_ac\_delta\_q_{ref1} + v1*v\_ac\_delta\_q_{ref2} + r2)/(v0+v1)$$

In Equation Set 3, example values of weighting factors, w0, w1, v0 and v1 include but not limited to: w0=w1=v0=v1=1, where r0=(w0+w1)/2 and r1=(v0+v1)/2.

In some embodiments, the quantization parameters used for chroma color components (e.g., base_qindex+u_ac_delta_q and base_qindex+v_ac_delta_q) are derived by the quantization parameters used in the reference frames (base_qindexref1+u_ac_delta_qref1, base_qindexref2+u_ac_delta_qref2, base_qindexref1+v_ac_delta_qref1 and base_qindexref2+v_ac_delta_qref2) using Equation Set 4 below.

Equation Set 5—Luma and Chroma AC Coefficient Derivation $$base\_qindex = (k0*base\_qindex_{ref1} + k1*base\_qindex_{ref2} + r0)/(k0+k1)$$

base_qindex + u_ac_delta_q =

$$(w0*(base\_qindex_{ref1} + u\_ac\_delta\_q_{ref1}) +$$

-continued $$w1 * \left(\text{base\_qindex}_{ref2} + \text{u\_ac\_delta\_q}_{ref2}\right) + r0)/(w0 + w1)$$

$$\text{base\_qindex} + \text{v\_ac\_delta\_q} =$$

$$\left(v0 * \left(\text{base\_qindex}_{ref1} + \text{v\_ac\_delta\_q}_{ref1}\right) + \right.$$

$$\left. v1 * \left(\text{base\_qindex}_{ref2} + \text{v\_ac\_delta\_q}_{ref2}\right) + r1\right)/(v0 + v1)$$

In Equation Set 4, ref1 and ref2 refer to the first and second reference pictures.

In some embodiments, the weighting factors are implicitly derived by the coded information, such as the temporal distance of the reference frames to the current frame, the temporal layer associated with the reference frames, the coding mode used in the reference frames, whether the reference frames are intra only frames, and/or whether global motion is used in the reference frame.

FIG. 6B is a flow diagram illustrating a method 650 of encoding video in accordance with some embodiments. The method 650 may be performed at a computing system (e.g., the server system 112, the source device 102, or the electronic device 120) having control circuitry and memory storing instructions for execution by the control circuitry. In some embodiments, the method 650 is performed by executing instructions stored in the memory (e.g., the memory 314) of the computing system.

The system receives (652) video data comprising a plurality of pictures. The system encodes (654) a first picture of the plurality of pictures. The system determines (656), based on whether the first picture is encoded with a frame-level interpolation mode and whether a prediction enhancement filter (PEF) is enabled for the first picture, whether one or more quantization parameters for the first picture are to be signaled. When the first picture is encoded with the frame-level interpolation mode and the PEF is enabled, the system signals (658) a set of base and delta quantization parameters for the first encoded picture. When the first picture is encoded with the frame-level interpolation mode and the PEF is disabled, the system forgoes (660) signaling the set of base and delta quantization parameters for the first encoded picture. The system transmits (662) the encoded first picture via a video bitstream.

As described previously, the encoding process may mirror the decoding processes described herein. For brevity, those details are not repeated here.

Although FIGS. 6A and 6B illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In one aspect, some embodiments include a method (e.g., the method 600) of video decoding. In some embodiments, the method is performed at a computing system having memory and one or more processors. The method includes: (i) receiving a video bitstream comprising a plurality of encoded pictures; (ii) obtaining a reconstructed picture that corresponds to an encoded picture of the plurality of encoded pictures; (iii) deriving a set of quantization parameters for the reconstructed picture, the set of quantization parameters derived from a set of reference quantization parameters for the encoded picture; and (iv) performing loop filtering on the reconstructed picture using the set of quantization parameters. For example, all quantization parameters that are used to perform loop filtering on top of the frame reconstruction using frame-level mode of a frame interpolation mode are implicitly derived. In some embodiments, the set of quantization parameters are for each of the color components for the encoded picture (e.g., luma and chroma components). As another example, only selected quantization parameters are signaled, and part of quantization parameters are implicitly derived but not signaled. In some embodiments, the reconstructed picture corresponds to a frame-level mode applied to the encoded picture.

(A2) In some embodiments of A1, the set of quantization parameters for the reconstructed picture are derived when a frame-level frame interpolation mode is enabled for the encoded picture. In some embodiments, the frame-level mode is a direct output prediction such as a whole frame skip mode, a global motion mode, and/or a temporal interpolated prediction. In some embodiments, the set of quantization parameters are derived in accordance with the frame-level mode being applied.

(A3) In some embodiments of A2, the method further includes: (i) determining, based on a first signaled indicator in the video bitstream, whether the set of quantization parameters are to be derived or parsed from the video bitstream, where the set of quantization parameters for the reconstructed picture are derived in accordance with the first signaled indicator having a first value; and (ii) when the first signaled indicator has a second value, parsing the set of quantization parameters from the video bitstream. In some embodiments, in accordance with the first signaled indicator having a first value, the set of quantization parameters are derived and, in accordance with the first signaled indicator having a second value, the set of quantization parameters are parsed from the video bitstream. For example, the quantization related parameters for each color components (including luma and chroma) are signaled, and these quantization related parameters are used to perform the loop filtering on top of the reconstructed picture of frame-level mode of the frame interpolation method. In some embodiments, the quantization parameters related to chroma color components are signaled on top of the frame-level mode of the frame interpolation method. For example, the quantization parameters related to the quantization on chroma AC coefficients (such as u_ac_delta_q and v_ac_delta_q as defined in AVM) are signaled. As another example, the quantization parameters related to the quantization on chroma DC coefficients are signaled.

(A4) In some embodiments of A2 or A3, the frame-level frame interpolation mode is a temporal interpolated prediction (TIP) mode. In some embodiments, the set of quantization parameters for the reconstructed picture are derived in accordance with a determination that the TIP mode is enabled for the encoded picture.

(A5) In some embodiments of any of A2-A4, the method further includes determining, based on a second signaled indicator in the video bitstream, that the frame-level frame interpolation mode is enabled for the encoded picture. For example, a flag (e.g., denoted enable_tip) equal to a first value (e.g., 1) indicates that a TIP mode is enabled for the encoded picture.

(A6) In some embodiments of any of A1-A5, the set of reference quantization parameters correspond to one or more reference pictures for the encoded picture. For example, quantization parameters associated with the reference pictures (e.g., used to derive the interpolated frame of the current frame using a frame interpolation method) are used to derive the quantization parameters that are used to perform loop filtering on the interpolated frame of the current frame using the frame interpolation method.

(A7) In some embodiments of any of A1-A6, the set of quantization parameters comprise AC chroma coefficients. For example, the set of quantization parameters include a base quantization index, a delta quantization value for a U channel, and a delta quantization value for a V channel.

(A8) In some embodiments of any of A1-A7, the method further includes deriving a second set of quantization parameters for the reconstructed picture based on coded information. For example, only the quantization parameters related to the quantization applied on luma color components are signaled, for quantization parameters related to chroma color components, the parameters are implicitly derived.

(A9) In some embodiments of A8, the second set of quantization parameters are the same as the set of quantization parameters. For example, chroma quantization parameters are restricted to be the same as luma quantization parameters, such that chroma quantization related parameters are not signaled but implicitly derived. As another example, it is restricted that the chroma delta quantization parameters (e.g., used to indicate the difference of quantization parameters between chroma and luma, or between chroma AC coefficients and chroma DC coefficients) are zero, such that the signaling of chroma delta quantization parameters are not needed.

(A10) In some embodiments of A8 or A9, the set of quantization parameters corresponds to a first color component and the second set of quantization parameters corresponds to a second color component. For example, the set of quantization parameters corresponds to a luma component and the second set of quantization parameters corresponds to a chroma component.

(A11) In some embodiments of any of A1-A10, the set of quantization parameters are derived from a weighted sum of the set of reference quantization parameters. For example, a weighted sum of the quantization parameters associated with the reference pictures is calculated to derive the quantization parameters that are used to perform loop filtering on the interpolated frame of the current frame using method A. As another example, the quantization parameters used for luma and/or chroma, that are associated with the reference frame, are used to calculate the quantization parameters used for luma and/or chroma. For example, denote the luma AC coefficient QP (quantization parameters) as base QP, the difference between luma AC and chroma AC QPs as u_ac_delta_q and v_ac_delta_q for Cb and Cr color components, respectively, as illustrated in Equation Set 4. As another example, the quantization parameters used for chroma color components (e.g., base_qindex+u_ac_delta_q and base_qindex+v_ac_delta_q) are derived by the quantization parameters used in the reference frames (base_qindexref1+u_ac_delta_qref1, base_qindexref2+u_ac_delta_qref2, base_qindexref1+v_ac_delta_qref1 and base_qindexref2+v_ac_delta_qref2) as illustrated in Equation Set 5.

(A12) In some embodiments of A11, a set of weighting factors for the weighted sum are derived from coded information. For example, the weighting factors are implicitly derived by the coded information, such as the temporal distance of the reference frames to the current frame, the temporal layer associated with the reference frames, the coding mode used in the reference frames, whether the reference frames are intra only frames, and/or whether global motion is used in the reference frame.

(A13) In some embodiments of any of A1-A12, the set of quantization parameters are derived using one or more AC delta parameters from the set of reference quantization parameters. For example, the difference between the quantization parameters used for chroma AC coefficients and other signaled quantization parameters, e.g., u_ac_delta_q and v_ac_delta_q, are derived by the corresponding syntaxes used in the reference frames (e.g., u_ac_delta_qref1 and u_ac_delta_qref2, v_ac_delta_qref1 and v_ac_delta_qref2, where ref1 and ref2 refer to the first and second reference pictures) as illustrated in Equation Set 2.

(A14) In some embodiments of any of A1-A13, the set of quantization parameters are derived using one or more base quantization parameters from the set of reference quantization parameters. For example, the quantization parameters used for chroma color components (e.g., base_qindex+u_ac_delta_qand base_qindex+v_ac_delta_q) are derived by the quantization parameters used in the reference frames (base_qindexref1+u_ac_delta_qref1, base_qindexref2+u_ac_delta_qref2, base_qindexref1+v_ac_delta_qref1 and base_qindexref2+v_ac_delta_qref2) as illustrated in Equation Set 3.

(B1) In another aspect, some embodiments include a method (e.g., the method 650) of video encoding. In some embodiments, the method is performed at a computing system having memory and one or more processors. The method includes: (i) receiving video data comprising a plurality of pictures; (ii) encoding a first picture of the plurality of pictures; (iii) determining, based on whether the first picture is encoded with a frame-level interpolation mode and whether a prediction enhancement filter (PEF) is enabled for the first picture, whether one or more quantization parameters for the first picture are to be signaled; (iv) when the first picture is encoded with the frame-level interpolation mode and the PEF is enabled, signaling a set of base and delta quantization parameters for the first encoded picture; (v) when the first picture is encoded with the frame-level interpolation mode and the PEF is disabled, forgoing signaling the set of base and delta quantization parameters for the first encoded picture; and (vi) transmitting the encoded first picture via a video bitstream.

(B2) In some embodiments of B1, the frame-level frame interpolation mode is a temporal interpolated prediction (TIP) mode.

(B3) In some embodiments of B1 or B2, the set of base and delta quantization parameters comprises AC coefficients.

(B4) In some embodiments of any of B1-B3, the set of base and delta quantization parameters correspond to two or more color components.

(C1) In another aspect, some embodiments include a method of visual media data processing. In some embodiments, the method is performed at a computing system having memory and one or more processors. The method includes: (i) obtaining a source video sequence; and (ii) performing a conversion between the source video sequence and a bitstream of visual media data, where the bitstream includes: (a) a plurality of encoded pictures, including a first encoded picture that is encoded in accordance with a first type of frame interpolation; (b) a first indicator indicating whether a temporal interpolation mode (TIP) is enabled for the first encoded picture; (c) a second indicator indicating whether a prediction enhancement filter (PEF) is enabled for the first encoded picture; and, (d) when the first indicator indicates that the TIP mode is enabled and the second indicator indicates that the PEF is enabled, a set of base and delta quantization parameters for the first encoded picture;

and where, when the first indicator indicates that the TIP mode is enabled and the second indicator indicates that the PEF is disabled, the bitstream does not include the set of base and delta quantization parameters for the first encoded picture.

(C2) In some embodiments of C1, the bitstream further includes a set of reference base and delta quantization parameters for one or more reference pictures for the first encoded pictures.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A14, B1-B4, and C1-C2 above). In yet another aspect, some embodiments include a non-transitory computer-readable storage medium storing one or more sets of instructions for execution by control circuitry of a computing system, the one or more sets of instructions including instructions for performing any of the methods described herein (e.g., A1-A14, B1-B4, and C1-C2 above).

As used herein, N refers to a variable number. Unless explicitly stated, different instances of N may refer to the same number (e.g., the same integer value, such as the number 2) or different numbers.

Unless otherwise specified, any of the syntax elements described herein may be high-level syntax (HLS). As used herein, HLS is signaled at a level that is higher than a block level. For example, HLS may correspond to a sequence level, a frame level, a slice level, or a tile level. As another example, HLS elements may be signaled in a video parameter set (VPS), a sequence parameter set (SPS), a picture parameter set (PPS), an adaptation parameter set (APS), a slice header, a picture header, a tile header, and/or a CTU header.

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video decoding performed at a computing system having memory and one or more processors, the method comprising:
   receiving a video bitstream comprising a plurality of encoded pictures;
   obtaining a reconstructed picture that corresponds to an encoded picture of the plurality of encoded pictures;
   when a frame-level frame interpolation mode is enabled for the encoded picture, deriving a set of quantization parameters for the reconstructed picture, the set of quantization parameters derived from a set of reference quantization parameters for the encoded picture; and
   performing loop filtering on the reconstructed picture using the set of quantization parameters.

2. The method of claim 1, further comprising:
   determining, based on a first signaled indicator in the video bitstream, whether the set of quantization parameters are to be derived or parsed from the video bitstream;
   wherein the set of quantization parameters for the reconstructed picture are derived in accordance with the first signaled indicator having a first value; and
   when the first signaled indicator has a second value, parsing the set of quantization parameters from the video bitstream.

3. The method of claim 1, wherein the frame-level frame interpolation mode is a temporal interpolated prediction (TIP) mode.

4. The method of claim 1, further comprising determining, based on a second signaled indicator in the video bitstream, that the frame-level frame interpolation mode is enabled for the encoded picture.

5. The method of claim 1, wherein the set of reference quantization parameters correspond to one or more reference pictures for the encoded picture.

6. The method of claim 1, wherein the set of quantization parameters comprise AC chroma coefficients.

7. The method of claim 1, further comprising deriving a second set of quantization parameters for the reconstructed picture based on coded information.

8. The method of claim 7, wherein the second set of quantization parameters are the same as the set of quantization parameters.

9. The method of claim 7, wherein the set of quantization parameters corresponds to a first color component and the second set of quantization parameters corresponds to a second color component.

10. The method of claim 1, wherein the set of quantization parameters are derived from a weighted sum of the set of reference quantization parameters.

11. The method of claim 10, wherein a set of weighting factors for the weighted sum are derived from coded information.

12. The method of claim 1, wherein the set of quantization parameters are derived using one or more AC delta parameters from the set of reference quantization parameters.

13. The method of claim 1, wherein the set of quantization parameters are derived using one or more base quantization parameters from the set of reference quantization parameters.

14. A computing system, comprising:

control circuitry;

memory; and one or more sets of instructions stored in the memory and configured for execution by the control circuitry, the one or more sets of instructions comprising instructions for:

receiving video data comprising a plurality of pictures;

encoding a first picture of the plurality of pictures;

determining, based on whether the first picture is encoded with a frame-level interpolation mode and whether a prediction enhancement filter (PEF) is enabled for the first picture, whether one or more quantization parameters for the first picture are to be signaled;

when the first picture is encoded with the frame-level interpolation mode and the PEF is enabled, signaling a set of base and delta quantization parameters for the first encoded picture; and when the first picture is encoded with the frame-level interpolation mode and the PEF is disabled, forgoing signaling the set of base and delta quantization parameters for the first encoded picture.

15. The system of claim 14, wherein the frame-level interpolation mode is a temporal interpolated prediction (TIP) mode.

16. The system of claim 14, wherein the set of base and delta quantization parameters comprises AC coefficients.

17. The system of claim 14, wherein the set of base and delta quantization parameters correspond to two or more color components.

18. A non-transitory computer-readable storage medium storing a video bitstream that is generated by a video encoding method, the video bitstream comprising:

a set of base and delta quantization parameters for a first picture when the first picture of video data is encoded with a frame-level interpolation mode and a prediction enhancement filter (PEF) is enabled, wherein the video bitstream does not include the set of base and delta quantization parameters for the first picture when the first picture is encoded with the frame-level interpolation mode and the PEF is disabled; and wherein the video encoding method comprises:

encoding the first picture, and determining, based on whether the first picture is encoded with the frame-level interpolation mode and whether the PEF is enabled for the first picture, whether one or more quantization parameters for the first picture are to be signaled.

19. The non-transitory computer-readable storage medium of claim 18, wherein the frame-level interpolation mode is a temporal interpolated prediction (TIP) mode.

* * * * *